નવ3,214,389
METHOD OF PREPARING A MANGANO-CHROMIA-MANGANITE CATALYST COMPOSITION
Clifton W. Cooke, Jr., Dunbar, W. Va., assignor to E. I. du Pont de Nemours and Company, Wilmington, Del., a corporation of Delaware
No Drawing. Filed Sept. 29, 1960, Ser. No. 59,201
9 Claims. (Cl. 252—468)

This invention relates to the preparation of mangano-chromia-manganites and is more particularly directed to processes for making such catalysts, supported or unsupported, by reaction of manganese carbonate or sulfide with chromium trioxide in the presence of water.

The products which it is desired to produce according to the invention are mangano-chromia-manganites which can be designated by the following:

$$XCr_2O_n \cdot 2YMnO_m$$

in which the Mn:Cr ratio ranges from 3:0.5 to 3:30. Instead of the weight ratio, the atomic ratio, that of Y:X=3:0.5 to 3:30, can be used for it is almost the same. In the formula, $n$ can be 2, 3, and 6 and $m$ can be 1, 1.33, 1.5, 2, and 2.5.

Wortz U.S. Patent 2,108,156 speaks of "manganese chromites" which represent the special situation where the ratio of Mn:Cr is 3:2. The Wortz product has this ratio because he starts with an equal molecular amount but a third of the chromium is not precipitated but is washed away.

The mangano-chromia-manganites and catalysts containing them together with refractory oxides are not specifically claimed herein because they are described and claimed as such and for treatment of automobile exhaust in a copending application of Howk and Stiles, Serial No. 828,778, filed July 22, 1959, now abandoned.

The mangano-chromia-manganites are made according to the present invention by reacting manganese carbonate or sulfide with chromium trioxide. By mixing these together in the presence of water, the reaction goes to completion by carbon dioxide or hydrogen sulfide leaving the system.

The manganese carbonate can be in any commercial form and may be in the form of its ore, rhodochrosite. The manganese sulfide also can be used in chemically pure form or as a product of commercial purity. The ore, alabandite, can thus be used.

The chromium trioxide, $CrO_3$, can be a product of commercial purity and while this is often spoken of as chromic acid anhydride it actually will contain some moisture in products of commercial grade. This amount of moisture is sufficient to effect the reaction when the components are intimately mixed and further water need not be added.

Small amounts of water can be added though in general no more will be used than is required to handle the mixture since there is always the problem of disposing of excesses of water. The components can be put in a slurry of any desired handleable concentration. Thus it is preferred to add none or to add only a small amount of water so that the mixture is apparently dry. Ordinarily the water will not exceed 50% of the total weight of water plus the solids in it. It could run higher, say to 75%, but this will involve handling larger quantities of water.

The ratio of the manganese carbonate or sulfide to the chromium trioxide should be such that the Mn:Cr weight ratio ranges from 3:05 to 3:30 depending upon the precise product which is wanted.

To the reacting mixture there can be added any of the conventional catalyst additions and there may be for example included such co-catalysts as those described in Lazier U.S. Patent 1,964,001. One or more of the following can be added preferably as the carbonate or sulfide or oxide:

Copper
Nickel
Zinc
Iron
Cadmium
Cobalt
Tin
Bismuth

It added as the sulfide, carbonate, or oxide there will be a reaction with the chromium trioxide.

The amount of the co-catalyst can vary greatly and can range from, say 1 to 50% by weight based upon the weight of the mangano-chromia-manganite. About 10% is preferred.

It is often desirable to add an interspersant to the catalyst aggregate as described in the above mentioned Howk and Stiles application Serial No. 828,778. The interspersants are refractories which have a melting point above 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-insoluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Berylia
(14) Zirconia
(15) Lanthana
(16) Hafnia Aluminum hydroxide which is present as oxide in the final product is preferred. Manganese oxide and chromia are listed as interspersants to be added in amounts exceeding those which would be present in the mangano-chromia-manganite of the ratios described.

Other insoluble compounds of the above metals can be similarly used such as barium chromate, calcium chromate, chrome oxides, calcium silicates, barium silicates, and magnesium aluminate. Other such insoluble compounds of the metals listed are the spinels prepared by reacting a basic oxide with an acidic oxide such as barium titanate, calcium titanate, manganese carbonate, aluminum chromite, magnesium, calcium, strontium, and barium as silicates, aluminates, titanates, zirconates and cerates.

It will be understood that while the interspersants will normally be in the form of the oxide in the final catalyst aggregate after calcination, the crystallites can be introduced in the form of heat-decomposable salts. They can be formed in situ in the presence of the mangano-chromia-manganite catalysts and in the presence of the co-catalyst. Such heat-decomposable products can be used as:

(1) Aluminum nitrate
(2) Thorium nitrate
(3) Cerium nitrate
(4) Chromium nitrate
(5) Calcium hydroxide, nitrate and acetate
(6) Barium hydroxide and nitrate
(7) Manganese nitrate
(8) Zinc nitrate
(9) Strontium nitrate, hydroxides, acetates and carbonates
(10) Magnesium nitrate, acetate
(11) Lanthanum nitrate
(12) Zirconyl nitrate Particles which can readily be introduced in the form of sols or dispersions in addition to those already listed above are:

(1) Magnesium oxide and hydroxide
(2) Titanium oxide, sol and gel
(3) Aluminum alcoholates
(4) Zircon powder
(5) Aluminum hydroxide gel
(6) Zirconia gel
(7) Cerium oxide
(8) Silica sol
(9) Zinc oxide and hydroxide
(10) Strontium
(11) Strontium oxide One or more interspersants can be added to the manganese carbonate or sulfide reaction with chromic acid and after the reaction is completed and the products have been calcined, a second interspersant can be added. This can be selected from the interspersants as above described and can be added as an aqueous solution of a compound which can be decomposed in situ or as a sol which can be introduced into the interstices of the catalyst aggregate.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

The mangano-chromia-manganite prepared by reacting as described can be pilled or tableted in conventional manner. Instead the catalyst can be supported upon a refractory body such as one of the following:

(1) Porous ceramic spheres, tablets, or rings which have a softening or melting point in excess of 1200° C.
(2) Etched nickel, nichrome, and inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules If this is to be done it is ordinarily preferred to apply the chromium trioxide to the refractory body in the amount desired, say, 1 to 20% by weight based upon the refractory body. The chromium trioxide can be in a solution or slurry and can be used to impregnate the refractory. An appropriate amount of manganese carbonate or sulfide or both can then be added.

Instead of adding the chromium trioxide as shown, a manganese salt can be added to the support first and then the chromic acid can be added. Still differently, the manganese carbonate or sulfide and the chromic acid can be mixed together first then poured over the support on which they will precipitate as in Example 8 below.

Processes of the invention are most preferably conducted using a carrier or support as described which has a surface area of at least 10 m.$^2$/g. and in which 40% of the pore volume is derived from pores with a diameter less than 200 Angstroms. It is still more preferred that the surface area be at least 80 m.$^2$/g. and that the dimensions of at least 60% of the pores are less than 200 Angstroms. In the listing above the bauxite, zirconia, titania, and activated alumina will ordinarily fall within these ranges.

The catalyst aggregate prepared by reaction as above described and supported or not can be calcined. The temperatures used should not be so high as to result in sintering of catalyst components. Temperatures from about 250-800° C. will be satisfactory. The time can run from a few minutes, say 5 or 10, and up to 30 minutes or an hour. The time can be extended until all compounds decomposable at the temperature used are decomposed and times up to 8 or 10 hours have been used. Unless a second interspersant is to be introduced as described hereinafter it is not necessary to effect calcination prior to putting the catalyst into use.

In order that the invention may be better understood reference should be had to the following illustrative examples.

*Example 1*

(1) Dissolve 100 pounds, 1 pound mole, of chromic acid anhydride ($CrO_3$) in 8 gallons of water.
(2) Add 55 pounds, 1 pound atom, of manganese as the carbonate to the chromic acid solution. Evolution of carbon dioxide gas will occur.
(3) The mixture is agitated for one-half hour.
(4) Heat product at 120°–150° C. for 16 hours to remove water. Calcine at 400° C. for three hours.
(5) Pulverize the calcined powder, mix with 1% of graphite and pill.

*Example 2*

As in Example 1 except 165 pounds of manganese as the carbonate is added to the 100 pounds of chromic acid anhydride in 8 gallons of water.

*Example 3*

As in Example 1 except 5.5 pounds of manganese as the carbonate is added to the 100 pounds of chromic acid anhydride in 8 gallons of water.

*Example 4*

(1) Dissolve 100 pounds, 1 pound mole, of chromic acid anhydride ($CrO_3$) in 8 gallons of water.
(2) Add 55 pounds, 1 pound atom, of manganese as the sulfide to the chromic acid solution. Evolution of hydrogen sulfide gas will occur.
(3) Proceed with steps 3 through 5 as in Example 1.

*Example 5*

(1) Proceed as in Example 1, step 1.
(2) Alter Example 1, step 2, to include the addition of 16 pounds of copper as basic copper carbonate and the addition of 15 pounds of nickel as basic nickel carbonate.
(3) Proceed with steps 3 through 5 as in Example 1.

Example 6

(1) Proceed as in Example 1, step 1.

(2) Alter Example 1, step 2, to include the addition of 90 pounds of alumina trihydrate, pulverulent and decomposable to crystallites 50 Angstroms in greatest dimension.

(3) Proceed with steps 3 through 5 as in Example 1.

Catalysts can be prepared as above using the same weight of interspersant other than alumina trihydrate. Thus an equal weight of titania, thoria, magnesia, calcium oxide, or silica can be used. The products in each instance being in the form of powders, pulverulent or decomposable to crystallites which average not substantially greater than 50 Angstroms in their largest dimension.

Example 7

(1) Mix 100 pounds, 1 pound mole, of chromic acid anhydride ($CrO_3$) with 55 pounds, 1 pound atom, of manganese as the carbonate.

(2) Heat the resulting mixture to 400° C. for 3 hours to form the mangano-chromia-manganite.

(3) Pulverize, mix the product thus prepared with 1% of graphite and pill or pellet.

Example 8

(1) Dissolve 100 pounds of chromic acid anhydride ($CrO_3$) in 45 gallons of water.

(2) Add 55 pounds, 1 pound atom, of manganese as the carbonate to the chromic acid solution. Evolution of carbon dioxide gas will occur.

(3) Add 1000 pounds of anhydrous alumina particles between ¼ inch and 8 mesh (Tyler) size.

(4) Mix by tumbling for ½ hour.

(5) Heat the product at 400° C. for three hours.

Example 9

(1) Proceed as in Example 8, step 1.

(2) Add 55 pounds, 1 pound atom, of manganese as the sulfide to the chromic acid solution. Evolution of hydrogen sulfide gas will occur.

(3) Proceed as in Example 8, steps 3 through 5.

Example 10

(1) Proceed as in Example 8, step 1.

(2) Alter Example 8, step 2, to include the addition of 16 pounds of copper as basic copper carbonate and the addition of 15 pounds of nickel as basic nickel carbonate.

(3) Proceed as in Example 8, steps 3 through 5.

Example 11

(1) 150 pounds of chromic acid anhydride is dissolved in 200 gallons of water.

(2) Add 55 pounds of manganese as the carbonate to the chromic acid solution. Add also 32 pounds of copper as basic copper carbonate.

(3) To the mixture add 75 pounds of alumina hydrate, pulverulent and decomposable to crystallites of the order of 50 Angstroms in greatest dimension. Also add 750 pounds of activated bauxite in the form of 2 to 4 mesh Tyler standard screen granules.

(4) Dry and calcine at 400° C. for three hours.

(5) Add to the granules 350 pounds of ammonium chromate dissolved and slurried in 200 gallons of distilled water. Heat, dry and calcine the resulting product. This forms an aggregate containing mangano-chromia-manganite with copper chromite as a co-catalyst, with alumina as an interspersant of crystallite size comparable to that of the manganite and with chromic oxide as a second interspersant.

I claim:

1. In a process for making a mangano-chromia-manganite catalyst having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed.

2. In a process for making a mangano-chromia-manganite catalyst having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is $3:0.5$ to $3:30$.

3. In a process for making a supported mangano-chromia-manganite catalyst, the steps consisting essentially of applying to a refractory body chromium trioxide and a manganese compound selected from the group consisting of manganese carbonate and manganese sulfide whereby $CO_2$ or hydrogen sulfide, respectively, is evolved and the mangano-chromia-manganite having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$, is formed on the surface of said refractory.

4. In a process for making a supported mangano-chromia-manganite catalyst, the steps consisting essentially of applying chromium trioxide to a refractory body and then adding thereto a manganese compound selected from the group consisting of manganese carbonate and manganese sulfide whereby $CO_2$ or hydrogen sulfide, respectively, is evolved and the mangano-chromia-manganite having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$ is formed on the surface of said refractory, the ratio of the manganese compound and the chromium trioxide being such that the Mn:Cr weight ratio is $3:0.5$ to $3:30$.

5. In a process for making a mangano-chromia-manganite catalyst having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is $3:0.5$ to $3:30$, there being added to said manganese compound a co-catalyst selected from the group consisting of the carbonate, sulfide, and oxide of copper, nickel, zinc, iron, cadmium, cobalt, tin, and bismuth.

6. In a process for making a mangano-chromia-manganite catalyst having the empirical formula $$XCr_2O_n \cdot 2YMnO_m$$

wherein the ratio of $Y:X = 3:0.5$ to $3:30$, $n = 2, 3$ and $6$ and $m = 1, 1.33, 1.5, 2,$ and $2.5$, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is 3:0.5 to 3:30, there being added to said manganese compound an interspersant which is a finely divided refractory with a melting point above 1000° C.

7. In a process for making a mangano-chromia-manganite catalyst having the empirical formula $$XCr_2O_n \cdot 2YMnO_m$$

wherein the ratio of Y:X=3:0.5 to 3:30, $n=2$, 3 and 6 and $m=1$, 1.33, 1.5, 2, and 2.5, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is 3:0.5 to 3:30, there being added to said manganese compound an interspersant which is introduced as a heat decomposable salt which upon heating yields a finely divided refractory with a melting point above 1000° C.

8. In a process for making a mangano-chromia-manganite catalyst having the empirical formula $$XCr_2O_n \cdot 2YMnO_m$$

wherein the ratio of Y:X=3:0.5 to 3:30, $n=2$, 3 and 6 and $m=1$, 1.33, 1.5, 2, and 2.5, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is 3:0.5 to 3:30, and thereafter adding an interspersant which is a finely divided refractory with a melting point above 1000° C.

9. In a process for making a mangano-chromia-manganite catalyst having the empirical formula $$XCr_2O_n \cdot 2YMnO_m$$

wherein the ratio of Y:X=3:0.5 to 3:30, $n=2$, 3 and 6 and $m=1$, 1.33, 1.5, 2, and 2.5, the steps consisting essentially of mixing a manganese compound from the group consisting of manganese carbonate and manganese sulfide with chromium trioxide in the presence of water whereby carbon dioxide or hydrogen sulfide, respectively, is evolved and the mangano-chromia-manganite is formed, the ratio of the manganese compound and the chromium trioxide being such that the Mn:Cr weight ratio is 3:0.5 to 3:30, and thereafter adding an interspersant which is introduced as a heat decomposable salt which upon heating yields a finely divided refractory with a melting point above 1000° C.

References Cited by the Examiner
UNITED STATES PATENTS

| | | | |
|---|---|---|---|
| 1,964,001 | 6/34 | Lazier | 252—467 X |
| 1,995,274 | 3/35 | Eversole | 252—465 X |
| 2,025,140 | 12/35 | Wenzel | 23—2 |
| 2,071,119 | 2/37 | Harger | 252—463 X |
| 2,108,156 | 2/38 | Wortz | 252—467 X |
| 2,677,663 | 5/54 | Jonker et al. | 23—58 X |

MAURICE A. BRINDISI, *Primary Examiner.*

JULIUS GREENWALD, *Examiner.*